United States Patent
Sher et al.

(10) Patent No.: US 9,034,448 B2
(45) Date of Patent: May 19, 2015

(54) METHODS FOR PREPARING MODIFIED RELEASE LINERS AND MODIFIED ADHESIVE ARTICLES

(75) Inventors: Frank T. Sher, St. Paul, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 295 days.

(21) Appl. No.: 13/257,203

(22) PCT Filed: Feb. 19, 2010

(86) PCT No.: PCT/US2010/024658
§ 371 (c)(1),
(2), (4) Date: Nov. 21, 2011

(87) PCT Pub. No.: WO2010/107543
PCT Pub. Date: Sep. 23, 2010

(65) Prior Publication Data
US 2012/0070604 A1  Mar. 22, 2012

Related U.S. Application Data

(60) Provisional application No. 61/161,810, filed on Mar. 20, 2009.

(51) Int. Cl.
| | | |
|---|---|---|
| *B32B 9/00* | (2006.01) | |
| *B32B 33/00* | (2006.01) | |
| *C09J 7/02* | (2006.01) | |
| *G09F 3/10* | (2006.01) | |

(52) U.S. Cl.
CPC ............... *C09J 7/0253* (2013.01); *G09F 3/10* (2013.01); *Y10S 428/916* (2013.01)

(58) Field of Classification Search
CPC ................................ G09F 3/10; C09J 7/0253
USPC ............. 428/40.1, 40.2, 41.8–42.3, 914–916
See application file for complete search history.

(56) References Cited

U.S. PATENT DOCUMENTS

| | | | | |
|---|---|---|---|---|
| 3,592,722 | A * | 7/1971 | Morgan | 428/198 |
| 4,121,003 | A * | 10/1978 | Williams | 428/42.1 |
| 5,296,277 | A | 3/1994 | Wilson | |
| 5,468,231 | A * | 11/1995 | Newman et al. | 604/180 |
| 5,633,058 | A * | 5/1997 | Hoffer et al. | 428/40.1 |
| 5,785,690 | A * | 7/1998 | Newman et al. | 604/180 |
| 6,339,111 | B1 | 1/2002 | Moon | |
| 6,482,489 | B1 * | 11/2002 | Otaki et al. | 428/40.1 |
| 6,759,110 | B1 | 7/2004 | Fleming | |
| 2003/0017291 | A1 | 1/2003 | Fleming | |
| 2004/0048024 | A1 | 3/2004 | Fleming | |
| 2004/0216833 | A1 | 11/2004 | Fleming | |
| 2007/0228720 | A1 * | 10/2007 | Saint et al. | 283/81 |

FOREIGN PATENT DOCUMENTS

| | | |
|---|---|---|
| EP | 0749335 | 3/1999 |
| KR | 10-2004-0030535 | 4/2004 |
| KR | 10-0740846 | 7/2007 |
| WO | WO 93-03107 | 2/1993 |
| WO | WO 00-69985 | 11/2000 |

OTHER PUBLICATIONS

Int'l Search Report for PCT/US2010/024658, mailed Oct. 5, 2010, 6 pages.

* cited by examiner

*Primary Examiner* — Patricia L Nordmeyer
(74) *Attorney, Agent, or Firm* — Jeffrey M. Olofson

(57) ABSTRACT

Adhesive articles are prepared through the use of modified release liners. The modified release liners include a fracturable layer and a release surface partially covering the fracturable layer. The modified release liners may be prepared by selective coating of a release material onto the fracturable layer or by selective treatment of a release surface to expose portions of the fracturable layer. Upon removal of an adhesive layer adhered to the modified release liner, portions of the fracturable layer of the release liner adhere to the adhesive layer to form a modified adhesive layer.

13 Claims, No Drawings

METHODS FOR PREPARING MODIFIED RELEASE LINERS AND MODIFIED ADHESIVE ARTICLES

CROSS REFERENCE TO RELATED APPLICATIONS

This application is a national stage filing under 35 U.S.C. 371 of PCT/US2010/024658, Filed Feb. 19, 2010, which claims priority to U.S. Application No. 61/161,810, filed Mar. 20, 2009, the disclosure of which is incorporated by reference in its/their entirety herein.

FIELD OF THE DISCLOSURE

The present disclosure relates to release liners, adhesive articles and methods for preparing and using the release liners and adhesive articles.

BACKGROUND

A variety of adhesive articles and constructions utilize release liners or other similar types of release surfaces to protect the surface of the article or construction prior to the use or application of the articles or constructions. The release liner is placed over the exposed adhesive layer to protect the adhesive from prematurely attaching to a substrate and to protect the adhesive from dirt, grease, etc which can interfere with the adhesive's ability to adhere to a substrate. Examples of articles and constructions that utilize release liners include virtually any article which contains an adhesive layer which may need to be protected for a period of time. Among the range of items which may contain release liners include a wide variety of tapes, labels, stickers, graphic articles and the like as well as parts, films, etc which may contain a coating of adhesive for assembly at a later time or in another location. Generally the liner is removed immediately prior to the adhesion of the article, such as peeling a label from its liner immediately before adhering it to an envelope.

In some instances the release liner may be used to modify the adhesive surface. In particular, liners with a microstructured surface have been used to prepare adhesive layers with modified surface topographies. Additionally, the microstructured features of the release liners can be used as containers of, for example, particles or wires which adhere to the adhesive layer upon lamination to the release liner.

SUMMARY

In this disclosure, adhesive articles are disclosed as well as methods for preparing adhesive articles. The methods for preparing adhesive articles use modified release liners. Methods for preparing modified release liners are also disclosed.

In one embodiment, adhesive articles are disclosed. The adhesive articles comprise a modified release liner that comprises a fracturable layer and a release surface partially covering the fracturable layer, and an adhesive layer comprising a first surface and a second surface wherein the first surface is in contact with the modified release liner, and wherein the adhesive strength of the interface between the adhesive layer and the fracturable layer is greater than the fracture strength of the fracturable layer, while the adhesive strength of the interface between the adhesive layer and the release surface is less than the fracture strength of the fracturable layer.

In another embodiment, methods of making adhesive articles are disclosed. The methods comprise providing a modified release liner, the modified release liner comprising a fracturable layer and a release surface partially covering the fracturable layer, contacting an adhesive layer onto the modified release liner such that the adhesive layer contacts the release surface and the fracturable layer in the regions not covered by the release surface, and removing the adhesive layer from the modified release liner, wherein portions of the fracturable layer remain adhered to the adhesive layer.

In another embodiment, methods of preparing release liners are disclosed. The methods comprise providing a base layer wherein the base layer comprises a fracturable layer, and selectively coating a release coating onto the fracturable layer. In other embodiments, the methods comprise providing a release liner, wherein the release liner comprises a base layer that comprises a fracturable layer and a release coating on the fracturable layer, and selectively treating the release coating. In some embodiments, the treatment selectively exposes the fracturable layer at the treatment sites. In other embodiments, the treatment selectively changes the surface energy of the release coating.

DETAILED DESCRIPTION

Release surfaces, such as release liners, which can modify adhesive layers laminated to them are desirable. Typically, release liners simply provide a delivery vehicle for the adhesive layer. Upon delivery of the adhesive layer, for example, by peeling the adhesive layer away from the release liner, the release liner is generally discarded or recycled. In general, release liners are designed to remain intact during the process of delivering the adhesive layer. It is generally considered undesirable or even unacceptable for portions of the release liner to be removed with the adhesive layer. This phenomenon is sometimes called "transfer" because it involves the transfer to the adhesive layer of some component from the release liner surface. In particular, release surfaces which are prepared from the polymerization of small monomers may be prone to this effect. Unreacted monomers or other low molecular weight impurities may transfer to the adhesive layer from the release surface. For this reason, release liners traditionally are designed to prevent transfer.

In this disclosure, transfer is utilized as a selective method of modifying the adhesive properties of the adhesive layer. The modification of the adhesive layer is achieved through the use of modified release liners comprising a fracturable layer and a release surface partially covering the fracturable layer. The modified release liners are prepared such that portions of the fracturable layer become separated from the release liner and adhere to the adhesive surface upon delivery of the adhesive layer.

As used herein, the term "release surface" refers to a surface that provides a low adhesive strength to adhesives, especially pressure sensitive adhesives. Examples of release surfaces include the surfaces of release liners and low adhesion backsizes.

As used herein, the term "release liners" refers to articles containing at least one release surface. When adhered to an adhesive layer, release liners adhere only lightly and are easily removed. A release liner may be a single layer (with only the base layer) or it may be a multilayer construction (with one or more coatings or additional layers in addition to the base layer). "Modified release liners" are multilayer release liners which contain a fracturable layer and a discontinuous release surface over the fracturable layer such that portions of the fracturable layer are exposed. The discontinuity of the release surface may be generated by a modifying process or through the application of a discontinuous coating of a release material onto the fracturable layer.

As used herein, the term "exposed", when referring to a fracturable layer of a modified release liner, means that the portions of the fracturable layer that are exposed are accessible to an adhesive layer when an adhesive layer is contacted to the modified release liner.

As used herein, the terms "contact", "contacted", and "contacting" when referring to an adhesive layer refer to various techniques for bringing an adhesive layer in contact with a surface such as by coating and drying, hot melt coating, laminating, and the like.

As used herein, the term "low adhesion backsize" or "LAB" refers to a release surface that is coated onto the back side of adhesive coated articles such as tapes. Tapes typically contain a backing with an adhesive coated on one side and a release coating on the opposite side. Thus when the tape is rolled up the adhesive contacts the low adhesion backsize permitting the tape to be unrolled again when used.

As used herein, the term "base layer" as related to release liners refers to the primary carrier layer of the release liner. In some embodiments the base layer may be the fracturable layer or the base layer may contain one or more coatings or additional layers which include the fracturable layer or fracturable layers if more than one of the layers is fracturable. Examples of base layers include papers, non-woven webs, polymeric films, foams, and the like.

As used herein, the term "release material" refers to a material which has a low surface energy. When used as the base layer of a release liner or coated onto a base layer of release liner the release material forms a release surface. Examples of release materials include low surface energy materials such as silicone materials, fluorochemical materials, olefin materials, or long-chain hydrocarbon-functional materials.

As used herein, the term "fracturable layer" refers to a part of a release liner. The fracturable layer is an essentially continuous layer and may comprise a single layer or multiple layers. The fracturable layer is attached to the release liner. The fracturable layer may be the base layer or may be a layer separate from the base layer. When an adhesive layer is contacted to the fracturable layer and removed, portions of the fracturable layer are removed from the release liner and adhere to the adhesive layer. The removal of portions of the fracturable layer by an adhesive can occur either from internal cohesive failure within the fracturable layer or may result from pulling away of portions of the fracturable layer from the base layer. Thus, upon removal of the adhesive layer from the release liner, the fracturable portions adhere to the adhesive layer in those regions where the fracturable layer is not covered by a release material.

As used herein, the term "positionable" refers to the surface of an adhesive layer such that the adhesive layer can be placed against a substrate surface and easily slid over the surface into a proper position without preadhering to the substrate. Pressure is generally applied to adhere the adhesive layer to the substrate. Positionable adhesives do not need to be repositionable.

As used herein, the term "repositionable" refers to the surface of an adhesive layer such that the adhesive layer can be applied and adhered to a substrate and then removed (generally within 24 hours) and reapplied without distorting, defacing, or destroying the backing, adhesive or substrate. Repositionable adhesives do not need to be positionable.

As used herein, the term "adhesive" refers to polymeric compositions useful to adhere together two adherends. Examples of adhesives include pressure sensitive adhesives. Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "pre-adhesive" refers to a composition that is not itself an adhesive but upon further processing, such as by drying or curing, the composition forms an adhesive. Examples of pre-adhesive compositions include solutions, dispersions, suspensions and the like which upon drying form an adhesive. Other examples include mixtures of reactive monomers, such as, for example, acrylic monomers or other free radically polymerizable monomers which upon curing form an adhesive.

The modified release liners of this disclosure comprise a fracturable layer that is partially covered by a release surface. The release surface does not completely cover the fracturable layer, providing regions of the surface of the liner where the fracturable layer is exposed. It should be noted that descriptions relating to release liners apply equally to low adhesion backsizes unless noted.

When an adhesive layer contacts the fracturable layer and the adhesive layer is removed, portions of the fracturable layer are removed from the release liner surface and become adhered to the adhesive layer. This transfer occurs because the energy of adhesion (adhesive strength) of the adhesive for the portions of the fracturable layer contacted by the adhesive is greater than the fracture energy of those portions of the fracturable layer. In other words, the fracturable portions adhere more strongly to the adhesive layer than they are bound to the release liner.

Modified release liners may be prepared in a variety of different ways, either by selectively modifying the surface of a release liner to expose the fracturable layer or by selective application of a release material to the surface which contains a fracturable layer. A variety of modification techniques can be used to modify the surface of a release liner, including physical modification, chemical modification, irradiation, surface treatments and the like. A number of coating techniques may be used to selectively apply a release material to a surface that does not have release properties. These coating techniques include: printing techniques such as inkjet printing, screen printing, gravure printing and the like; spraying techniques; and other similar coating techniques.

In some embodiments, the modified release liners contain a discontinuous release surface with exposed portions of a fracturable layer. The fracturable portions of the release liner are the ones that become separated from the release liner and adhered to the adhesive surface upon removal of the adhesive layer. The fracturable portions may be prepared in a variety of different ways. In some embodiments, a release surface with fracturable portions may be prepared by using a base layer which contains a fracturable surface and selectively coating this surface with a release material to generate a discontinuous release surface with fracturable portions. In other embodiments the release liner contains a fracturable layer covered by a release material and the release material surface is selectively modified to expose portions of the fracturable layer or to render regions of the release material surface non-releasing.

In the embodiments prepared by selectively coating a release material onto a fracturable base layer, the base layer itself may be fracturable or it may contain one or more layers that are fracturable. Examples of base layers that may be fracturable include, for example, paper materials, non-woven materials and foam materials. The composition of these types of materials is such that application of an adhesive layer directly to these materials can cause portions of the material to become adhered to the adhesive layer and removed from the bulk of the base layer upon removal of the adhesive layer. Paper and non-woven materials may contain fibers which can be extracted from the surface by an adhesive layer. Foams may contain prominences jutting out from the surface of the base layer and these prominences can be thin and fragile and easily pulled out of the base layer upon removal of the adhesive layer. Additionally, the porous structures of foams may contain voids into which adhesives can flow and encapsulate prominent features, permitting the facile removal of the prominences upon removal of the adhesive layer. For this reason, generally liners prepared from these materials contain a continuous coating of release material to generate a release surface over the paper, non-woven or foam layer. In this disclosure, release material is selectively coated onto the fracturable base layer to generate a discontinuous release layer with exposed fracturable portions.

In related embodiments, the base layer is not fracturable, so a fracturable layer or layers may be applied to the base layer. Examples of suitable fracturable layers include, for example, clay coatings, brittle polymeric coatings, filled polymeric coatings, polymer-bound particle coatings, and the like. In these embodiments, like the embodiments described above, release material is selectively coated onto the fracturable layer to generate a discontinuous release layer with exposed fracturable portions.

In other embodiments, the modified release liner is generated by selectively modifying an existing release liner. A wide variety of release liners are known and utilized in the adhesive arts. In these embodiments, virtually any release liner which contains a fracturable layer can be modified to generate the modified release liners of this disclosure. The release liner comprises at least two layers, a base layer and a release material layer. The base layer may be a single layer construction (where the base layer is a fracturable material) or the base layer may be a multilayer construction (where the base layer has at least one additional layer or coating). The liners also contain a release material layer which contains a low surface energy material such as a silicone material, a fluorochemical material, an olefin material, or a long-chain hydrocarbon-functional material. In some embodiments, the liner comprises a multilayer construction with a base layer (paper, coated paper, a non-woven web or a coated polymeric film) and a release coating (typically a silicone coating).

A variety of methods may be used to modify the surface of a release liner and generate a modified release liner. In some embodiments, the surface modification involves exposing the fracturable layer so that portions of the fracturable layer can be contacted by the adhesive layer. In other embodiments the surface modification involves selective modification of the release properties of the release surface. These modifications can change the surface energy of selective regions of the release surface, thereby increasing the adhesive strength that the adhesive has for that region of the release surface, and causing the adhesive strength to exceed the fracture strength of the underlying fracturable layer in those areas. Thus, when the adhesive is removed it removes portions of the release surface and the fracturable layer in the selectively modified regions. These methods of modification are referred to herein as "treatments" and are "selective" meaning that they affect only specific regions of the release liner surface. Examples of selective treatment techniques include, for example, selective physical abrasion, selective chemical modification, or selective application of an energy source.

A variety of physical abrasion techniques are suitable as selective treatments of the release liner surface. Examples of suitable physical abrasion techniques include, for example, scraping, cutting, sanding, slicing, partial or complete perforation, blasting with abrasive particles (e.g. sand blasting, ice blasting, shell blasting), scribing, ablating, burnishing, engraving, knurling and the like. A wide range of mechanical equipment and tools can be utilized to provide the selective treatment, either in a continuous line or in a batchwise fashion. In some embodiments, the release liner is passed through equipment containing tools which selectively physically abrade the liner. Examples of such tools include: pounce wheels; saw blades; knife blades; abrasive tools such as sandpaper, abrasive belts or sanding wheels; brushes such as wire brushes; and the like. Such tooling could be incorporated into a coater or other processing equipment such that the liner passes through the abrading tooling prior to coating with an adhesive or other processing steps such as rolling onto a jumbo or die cutting to form a release sheet or article.

A variety of chemical modification techniques may be suitable as selective chemical treatments of the release liner surface. Examples of suitable chemical treatments include, for example, selective application of a chemical reagent such as an oxidizing agent, a strong base or a solvent. The applied chemical reagent may change the surface energy of the release surface, increasing the adhesive strength that the adhesive has for that region of the release surface, thereby causing the adhesive strength to exceed the fracture strength of the fracturable layer in those areas. Alternatively, the applied chemical reagent may selectively remove the release material exposing the fracturable layer beneath the release coating. Examples of suitable chemical reagents include oxidizing agents such as, for example, nitric acid or chromic acid.

A variety of techniques for selective application of an energy source are suitable as selective treatments of the release liner surface. Examples of suitable energy application techniques include, for example, selective flame treatment, selective corona treatment, selective electron beam treatment, selective plasma treatment, or selective laser treatment (e.g. laser ablation). As with the selective application of a chemical reagent, the selective application of energy to the release surface may increase the adhesion of the adhesive to the release surface in the treated areas, thereby causing the adhesive strength to exceed the fracture strength of the fracturable layer in those areas. Alternatively, the selective energy application may selectively remove the release material exposing the fractural layer beneath the release coating.

The fracturable portions of the surface that are contacted by the adhesive layer and are removable from the release liner upon removal of the adhesive layer may be described as removable portions of the release liner. The removable portions of the release liner may be of widely varying shapes and sizes. Typically, the removable portions are in the micrometer scale, that is to say, no greater than 1,000 micrometers in size or less. Because the removable portions may be irregular in shape, the size refers to the diameter of the largest circle that can be completely contained within the lateral projection of the portion. In some embodiments, the portions of the release liner which become separated from the release liner have an average size of less than about 100 micrometers, less than about 50 micrometers, or even less than about 45 micrometers. In some embodiments, the portions removed from the release liner protrude from the surface of the adhesive layer.

In some embodiments, the portions of the release liner removed from the release liner protrude from the surface of the adhesive layer by at least one micrometer. In other embodiments the portions may protrude from the surface of the adhesive layer by greater than 1 micrometer, but less than 50 micrometers, from 1-40 micrometers, from 5-35 micrometers or even from 5-25, or 5-20 micrometers.

The release liners of this disclosure contain a release surface which selectively covers a fracturable layer. Generally the surface area of the release liner comprises at least a majority (i.e. greater than 50%) of the release surface and a minority of the exposed fracturable layer (i.e. less than 50%). As described above, the generation of selective exposed fracturable regions on the release liner surface can be achieved either through selective coating of a release material onto a fracturable surface or by selective modification of a release material surface. Typically the area of release liner surface which contains exposed fracturable regions is less than about 30% of the total surface area. In some embodiments the area of release liner surface which contains fracturable regions is from 1-25% of the total surface area. Alternatively, the release liner surface can be viewed as having greater than 70% of the total surface area being the release surface, or even 75-99% of the release liner surface being the release surface.

The regions of the exposed fracturable layer may be of widely varying shapes and sizes. Typically, the regions of the exposed fracturable layer are in the micrometer scale, that is to say, no greater than 1,000 micrometers in size or less. Because the regions of the exposed fracturable layer may be irregular in shape, the size of the regions refers to the diameter of the largest circle that can be completely contained within the lateral projection of the region. In some embodiments, the regions of the exposed fracturable layer have an average size of less than about 100 micrometers, less than about 50 micrometers, or even less than about 45 micrometers.

The modified release liners of this disclosure can be used to provide adhesive articles, including adhesive articles with modified adhesive properties. The adhesive articles have modified adhesive properties because when the fracturable regions of the release liner are contacted by an adhesive layer and the adhesive layer is subsequently removed, at least a portion of the fracturable region of the liner is transferred to the surface of the adhesive layer. This generates an adhesive layer with a surface that contains removable portions of the release liner adhered to it. This adhesion of removable portions of the release liner to the surface of the adhesive layer can produce a variety of modifications to the adhesive layer surface characteristics and properties. For example, the overall tack of the adhesive layer can be decreased, either temporarily or permanently. A reduction of overall tack may be desirable to generate an adhesive surface which is easier to handle or which can be easily applied and removed. In some embodiments, the portions of the release liner which adhere to the adhesive surface are relatively small and are able to be eventually absorbed or encapsulated by the adhesive making the reduction in overall tack a temporary effect.

In some embodiments, the removable portions of the release liner are relatively large and/or substantially incompatible with the adhesive surface and are not readily absorbed into the adhesive layer or encapsulated by the adhesive layer. Such embodiments can provide positionable and repositionable adhesives.

Positionability and repositionability are related and yet separate attributes of an adhesive layer. Positionable and repositionable adhesive articles are described, for example, in U.S. Pat. No. 5,296,277 (Wilson et al.).

The adhesive layer may comprise any suitable adhesive, but typically will be a pressure sensitive adhesive. Examples of suitable pressure sensitive adhesives include, for example: acrylate- and methacrylate-based pressure sensitive adhesives; natural rubber-based pressure sensitive adhesives; synthetic rubber-based pressure sensitive adhesives; olefin-based pressure sensitive adhesives; block copolymer-based pressure sensitive adhesives such as styrene-isoprene block copolymers for example; vinyl ether-based pressure sensitive adhesives; polyurethane- or polyurea-based pressure sensitive adhesives and silicone based pressure sensitive adhesives. Mixtures of these pressure sensitive adhesives may also be used in some embodiments. Generally the adhesive is chosen based upon the desired use of the adhesive articles prepared from the adhesive, as well as other factors such as cost, ease of handling and the like.

The adhesive layer may be formed from an adhesive or a pre-adhesive material. Examples of a suitable pre-adhesives are solvent borne adhesives such as adhesives dissolved, suspended, or dispersed in a solvent. Suitable solvents include, for example, water, alcohols, esters, ethers, ketones, hydrocarbons, halocarbons and the like. Upon coating, the solvent can be removed by drying, either at room temperature or at elevated temperatures by using, for example, an oven, to generate the adhesive layer.

The pre-adhesive may also comprise a mixture of monomers which upon polymerization give the adhesive layer. Both solventless and solvent borne techniques may be used to coat the pre-adhesive compositions. For solventless embodiments, the adhesive is typically prepared by a coat and cure technique. In this technique a coatable mixture is coated on a web and then subjected to curing, generally photochemically. The web may be a backing, substrate, release liner or the like. If the coatable mixture contains only monomers, the viscosity may not be sufficiently high to be readily coatable. Several techniques may be used to generate a mixture with a coatable viscosity. A viscosity modifying agent may be added such as high or relatively high molecular weight species or thixotropic agents such as colloidal silicas, etc. Alternatively the monomer mixture can be partially prepolymerized to give a coatable syrup as described in, for example, U.S. Pat. No. 6,339,111 (Moon, et al.).

Adhesive articles may be prepared in a variety of ways. Typically adhesive articles comprise at least three layers: a backing layer, an adhesive layer and a release layer. In some embodiments the backing layer is also a release layer. These adhesive articles are typically referred to as transfer tapes and can be adhered to a variety of substrate surfaces upon removal of one of the release liners to generate a new adhesive article. The second release layer may be removed from the adhesive layer before, during or after the adhesive layer is adhered to the desired substrate surface.

In other embodiments, the backing layer comprises a substrate, a film, a sheet or the like. The three layers may be brought together to form the article via different sequences of steps. For example, an adhesive layer may be coated or laminated to the backing layer. This construction may then be laminated to a modified release liner such as the ones disclosed above. Additionally, the adhesive layer may be coated or laminated to the modified release layer. The backing layer can be subsequently laminated to the release/adhesive construction.

Modified adhesive articles may also be prepared by modification of existing adhesive articles. Existing articles may comprise a liner, an adhesive layer and a backing. The adhesive layer can be removed from the liner and replaced by a modified liner such as described above, or the liner may be modified using the techniques described above. The adhesive layer can then be laminated to the modified liner to generate the modified adhesive article. These techniques may be useful, for example, when large production runs of adhesive articles are made and it is desired to modify only part of the run.

The adhesive layer may be an adhesive layer or a pre-adhesive layer. The adhesive layer may be a pre-formed adhesive layer which is laminated to either the backing layer or the release layer. Typically, to prepare a pre-formed adhesive layer, the adhesive or pre-adhesive is coated onto a release liner, any processing required to form the adhesive is carried out (such as drying or curing) and the adhesive layer can then be used to form laminates. Alternatively, the adhesive or pre-adhesive can be coated out directly onto either the backing layer or release layer using a variety of different coating methods. If the adhesive is dissolved or dispersed in a solvent, solvent processes, such as, for example, knife coating, roll coating, gravure coating, rod coating, curtain coating, and air knife coating may be used. If the adhesive is hot melt processable, solventless coating methods such as extrusion coating may be used.

A wide variety of backing constructions are suitable. For example the backing may be a nonwoven, paper, polymeric film (e.g., polyvinyl, polyolefin, polyurea, polyurethane, polyvinylchloride, or polyester), foam, or metalized film. The articles may be used for a variety of applications including graphic applications such as protection, decoration and signage, medical articles, sheet articles such as labelstock, tapes, and the like.

Large-format graphic articles or protective films are examples of suitable applications. Large-format graphic articles typically include a thin polymeric film backed by a pressure sensitive adhesive. These articles may be difficult to handle and apply onto a surface of a substrate. The large format article may be applied onto the surface of a substrate by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle and slide the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate. Examples of a large format protective films include decoration films and the like. While the wet application process has been used successfully in many instances, it is a time consuming and messy process. A "dry" application process is generally desirable for installing large format graphic articles. Adhesives that are positionable and repositionable may be applied with a dry installation process because they may be easily removed and repositioned as needed.

Besides traditional sheet-type articles, other adhesive-coated articles such as tapes can also be prepared. Tapes typically contain a backing with an adhesive coated on one side and a release coating on the opposite side. Thus when the tape is rolled up the adhesive contacts the release coating permitting the tape to be unrolled again when used. The release coatings on tapes are sometimes called "low adhesion backsizes" or "LABs".

The LAB coating can be prepared as a modified release surface using the same techniques as described above for release liners to generate selected fracturable regions on the LAB surface. When the tape is rolled up, the surface of the adhesive layer contacts the modified LAB surface which contains fracturable regions. Upon unrolling of the tape, at least a portion of the fracturable region of the LAB is transferred to the surface of the adhesive layer.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| Liner-1 | The release liner was the liner removed from 3M SCOTCHCAL 1330 Series product commercially available from 3M Company, St. Paul, MN. |
| Liner-2 | Liner prepared from clay coated paper with a basis weight of 78 pounds per ream and coated with a tin-cured silicone release coating. |
| Pounce Wheel | A SCHUL-SON pounce wheel with a 2.54 centimeter (1 inch) tip-to-tip diameter and 22 4.5 millimeter long pins. |
| Abrasive Belt | 961G cloth abrasive belt commercially available from 3M Company, St. Paul, MN. |
| Wire Brush | EMRO number 83 hand wire brush having carbon steel wires. |
| Test Film Article-1 | The article was SCOTCHCAL Graphic Film 3650-10, commercially available from 3M Company, St. Paul, MN. |

Example 1

A sample of Liner-1 was modified by rolling a pounce wheel having sharp pins in various directions over the liner surface. The adhesive and backing that had been attached to the liner were re-laminated to the modified face of Liner-1. The release liner was removed and surface of the adhesive layer was observed with Jena Jenavert incident light microscope and a WYKO Optical Profiler. Material specks were observed on the adhesive surface. The largest material specks were approximately 85 micrometers wide and protruded from the adhesive surface 11-35 micrometers.

Example 2

A sample of Liner-1 was modified by dragging a pounce wheel having sharp pins in various directions over the liner surface, not allowing the pounce wheel to roll. The adhesive and backing that had been attached to the liner were re-laminated to the modified face of Liner-1. The release liner was removed and surface of the adhesive layer was observed with Jena Jenavert incident light microscope and a WYKO Optical Profiler. Material specks were observed on the adhesive surface. The largest material specks were approximately 50-60 micrometers wide and protruded from the adhesive surface 14-21 micrometers (some protruded up to 30 micrometers).

Example 3

A sample of Liner-1 was modified by dragging a hack saw blade having 24 teeth per inch (about 9 teeth per centimeter)

across the liner surface making rows of scratches on the liner surface. The adhesive and backing that had been attached to the liner were re-laminated to the modified face of Liner-1. The release liner was removed and surface of the adhesive layer was observed with Jena Jenavert incident light microscope and a WYKO Optical Profiler. Material specks were observed on the adhesive surface. The largest material specks were approximately 35 micrometers wide and protruded from the adhesive surface 15-17 micrometers. The adhesive and backing construction was placed lightly onto smooth glass. The adhesive layer that corresponded to the area of the liner that was not modified quickly adhered to the glass while the portions of the adhesive layer that corresponded to the area of the liner that was modified easily slid on the glass and, with firmer pressure, securely bonded the construction to the glass.

Example 4

A sample of Liner-1 was modified by rubbing an Abrasive Belt one time over regions of the liner surface. The adhesive and backing that had been attached to the liner were re-laminated to the modified face of Liner-1. The release liner was removed and surface of the adhesive layer was observed to contain rows of material specks.

Example 5

A sample of Liner-1 was modified by rubbing a Wire Brush in 2 directions over the surface of the release liner. The adhesive and backing that had been attached to the liner were re-laminated to the modified face of Liner-1. The release liner was removed and surface of the adhesive layer was observed to have intersecting rows of material specks. The adhesive and backing construction was placed lightly onto smooth glass. The adhesive layer corresponding the areas of the release liner that were modified easily slid on the glass and, with firmer pressure, securely bonded the construction to the glass.

Example 6

A sample of Liner-2 was modified by holding a lighted match under one spot of the release face of the release liner. A sample of Test Film Article-1 was removed from its liner and the adhesive and backing construction was laminated onto the flame treated liner. The liner was removed from the adhesive and backing construction. The spot on the adhesive layer corresponding to the spot of the liner exposed to the flame was non-tacky to the touch. The surrounding region of the adhesive was tacky.

What is claimed is:

1. An adhesive article comprising:
  a release construction comprising:
    an essentially continuous fracturable layer; and
    a discontinuous release surface over the fracturable layer such that portions of the fracturable layer are exposed; and
  an adhesive layer comprising a first surface and a second surface wherein the first surface is in contact with the release construction such that the adhesive contacts the release surface and the fracturable layer in the regions not covered by the release surface, and wherein the adhesive strength of
  the interface between the adhesive layer and the fracturable layer is greater than the fracture strength of the fracturable layer, while the adhesive strength of the interface between the adhesive layer and the release surface is less than the fracture strength of the fracturable layer.

2. The adhesive article of claim 1 further comprising a backing in contact with the second surface of the adhesive layer.

3. The adhesive article of claim 1 wherein the release surface covers greater than 70% of the release construction surface area.

4. The adhesive article of claim 1 wherein the size of the portions of the fracturable layer that are exposed is less than 1,000 micrometers, wherein the size refers to the diameter of the largest circle that can be completely contained within a lateral projection of the portions of the fracturable layer that are exposed by the discontinuous release surface.

5. The adhesive article of claim 1 wherein the fracturable layer comprises a fracturable substrate.

6. The adhesive article of claim 5 wherein the fracturable substrate comprises paper, a non-woven web or a foam.

7. The adhesive article of claim 1 wherein the fracturable layer comprises a coating.

8. The adhesive article of claim 7 wherein the coating comprises a clay coating, brittle polymeric coating, filled polymeric coating, or polymer-bound particle coatings.

9. The adhesive article of claim 1 wherein the release surface is the surface of a layer, the layer comprises a silicone material, a fluorochemical material, an olefin material, or a long-chain hydrocarbon-functional material.

10. The adhesive article of claim 1 wherein the article comprises a tape, a sheet article, a graphic article, or a medical article.

11. A method of making an adhesive article comprising:
  providing a release liner, the release liner comprising:
    a fracturable layer; and
    a release surface partially covering the fracturable layer;
  contacting an adhesive layer onto the release liner such that the adhesive layer contacts the release surface and the fracturable layer in the regions not covered by the release surface; and
  removing the adhesive layer from the release liner, wherein portions of the fracturable layer remain adhered to the adhesive layer.

12. The method of claim 11 wherein contacting an adhesive layer onto the release liner comprises coating an adhesive or pre-adhesive material to the liner or laminating an adhesive layer onto the release liner.

13. The method of claim 11 wherein the portions of the of the fracturable layer of the release liner that remain adhered to the adhesive layer are protrusions that protrude from the adhesive layer surface by more than 1 micrometer but less than 50 micrometers.

* * * * *